US010257714B2

(12) United States Patent
Irnich et al.

(10) Patent No.: US 10,257,714 B2
(45) Date of Patent: Apr. 9, 2019

(54) CHANNEL SELECTION ALGORITHM WITH CONSECUTIVE SEARCH LOOPS (71) Applicant: Telefonaktiebolaget LM Ericsson (publ), Stockholm (SE)

(72) Inventors: Tim Irnich, Neuss (DE); Reem Karaki, Aachen (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 2 days.

(21) Appl. No.: 15/513,650

(22) PCT Filed: Oct. 2, 2014

(86) PCT No.: PCT/EP2014/071147
§ 371 (c)(1),
(2) Date: Mar. 23, 2017

(87) PCT Pub. No.: WO2016/050307
PCT Pub. Date: Apr. 7, 2016

(65) Prior Publication Data
US 2017/0251371 A1    Aug. 31, 2017

(51) Int. Cl.
*H04W 16/10* (2009.01)
*H04W 24/02* (2009.01)
*H04B 17/345* (2015.01)

(52) U.S. Cl.
CPC ........... *H04W 16/10* (2013.01); *H04W 24/02* (2013.01); *H04B 17/345* (2015.01)

(58) Field of Classification Search
None
See application file for complete search history.

(56) References Cited

U.S. PATENT DOCUMENTS

2008/0175185 A1* 7/2008 Ji .................... H04W 52/243
370/318
2011/0092200 A1* 4/2011 Charbit ............... H04J 11/0069
455/424
2015/0078346 A1* 3/2015 Farhadi ................ H04W 16/14
370/336

FOREIGN PATENT DOCUMENTS

JP    2013081089 A    5/2013
WO    2004042971 A1    5/2004

* cited by examiner

*Primary Examiner* — Kevin C. Harper
*Assistant Examiner* — Derrick V Rose
(74) *Attorney, Agent, or Firm* — Coats & Bennett, PLLC (57) ABSTRACT Controlling utilization of a plurality of frequency channels in a cellular network by a node by using a channel selection algorithm which is based on an initial channel allocation and two consecutive sequences of channel allocation processes. The concepts described may be used for efficiently controlling utilization of a plurality of frequency channels in a cellular network. In particular, due to the consecutive search loops, an optimized allocation of frequency channels to a plurality of access nodes can be obtained in an automated manner, without requiring excessive measurements or trial of allocations.

27 Claims, 6 Drawing Sheets

CHANNEL SELECTION ALGORITHM WITH CONSECUTIVE SEARCH LOOPS

TECHNICAL FIELD

The present invention relates to methods for controlling utilization of frequency channels in a cellular network and to corresponding devices.

BACKGROUND

In cellular networks, e.g., as specified by 3GPP ($3^{rd}$ Generation Partnership Project), increasing traffic demand results in a need for more radio spectrum bandwidth. One way to provide more radio spectrum bandwidth is expansion into unlicensed frequency spectra, e.g., as typically used by WLAN (Wireless Local Area Network) technologies. For example, in 3GPP meeting contribution RP-140240, 3GPP TSG RAN Meeting #63, Fukuoka, Japan, 3-6 Mar. 2014, it is proposed to study extension of the LTE (Long Term Evolution) radio technology for operation in unlicensed frequency bands.

In an unlicensed frequency band, typically more bandwidth than the maximum standardized LTE carrier bandwidth of 20 MHz is available. Accordingly, the conventional practice of running all LTE base stations of a network on the same frequency may be suboptimal because the larger available bandwidth allows for reducing intra-cell interference by distributing base stations over multiple different frequency channels. Further, channel quality in unlicensed frequency bands may vary depending on time, location and/or frequency, which means that also the optimum selection of the frequency channel may vary for each base station. Therefore, it is generally desirable to perform selection of the frequency channels for the base stations on the basis of a constantly running automated algorithm.

In a general context, the problem of frequency channel selection has been studied intensively for a long time and many different algorithms have been proposed. On a high level, one may distinguish algorithms that are intended for offline frequency planning of cellular networks like in the case of GSM (Global System for Mobile Communications), and real-time algorithms that are intended to be implemented as a Self-optimizing Network (SON) feature in base stations. The main difference between these two categories is the amount of input information they require and the computation time until they deliver results. Offline algorithms are typically allowed to run for a very long time, e.g., hours or days, and can afford a significantly higher computational complexity, while real-time algorithms should deliver results in seconds or faster, and may need to cope with limited input information.

Frequency selection algorithms can be implemented in a distributed or a centralized way. Here, distributed means that independent algorithm instances run, e.g., in each base station. The different algorithm instances influence each other for example in terms of how much interference another instance sees on a given channel. In a centralized approach, all information is gathered in a central location, which allows for a more complete assessment of the overall situation and facilitates finding an optimal solution. Distributed algorithms have a higher risk of being trapped in local minima and are typically iterative, i.e., which means that the system typically runs through a number of suboptimal stages before it may reach a steady state. In a centralized algorithm, even if it is based on iterations, system operation can converge in one step. Further, a centralized algorithm is more likely to find a global optimum because information from various parts of the network can be considered. In each case, finding an algorithm which offers a suitable tradeoff between system performance gain, computational complexity, execution time, signaling overhead, and other aspects is a complex task.

Accordingly, there is a need for techniques which allow for efficiently controlling frequency channel utilization in a cellular network.

SUMMARY

According to an embodiment of the invention, a method of controlling utilization of a plurality of frequency channels in a cellular network is provided. According to the method, a node of the cellular network determines, for each of a plurality of access nodes of the cellular network, a first amount of interference experienced by the access node when utilizing an initial allocation of the frequency channels to the access nodes. Further, the node determines a first allocation of frequency channels by a first sequence of allocation processes in the order of decreasing first amount of interference experienced by the access node. For each of the access nodes the first sequence of allocation processes comprises determining, for each of the frequency channels, an aggregated amount of interference by summing an amount of interference experienced by the access node when utilizing the frequency channel and amounts of interference experienced by a group of the access nodes to which one of the frequency channels was already allocated in the first sequence of allocation processes when respectively utilizing this allocated frequency channel, and allocating the frequency channel corresponding to the lowest amount of aggregated interference to the access node. Further, the node determines, for each of the access nodes, a second amount of interference experienced by the access node when utilizing the first allocation of the frequency channels to the access nodes. The node then determines a second allocation of frequency channels by a second sequence of allocation processes in the order of decreasing second amount of interference experienced by the access node. For each of the access nodes, the second sequence of allocation processes comprises determining, for each of the frequency channels, an aggregated amount of interference by summing an amount of interference experienced by the access node when utilizing the frequency channel and amounts of interference experienced by all other access nodes when utilizing their allocated frequency channels, and allocating the frequency channel corresponding to the lowest amount of aggregated interference to the access node.

According to a further embodiment of the invention, a node for a cellular network is provided. The node comprises an interface for communication with access nodes of the cellular network. Further, the node comprises at least one processor. The at least one processor is configured to determine, for each of a plurality of the access nodes of the cellular network, a first amount of interference experienced by the access node when utilizing an initial allocation of a plurality of frequency channels to the access nodes. Further, the at least one processor is configured to determine a first allocation of frequency channels by a first sequence of allocation processes in the order of decreasing first amount of interference experienced by the access node. For each of the access nodes, the first sequence of allocation processes comprises determining, for each of the frequency channels, an aggregated amount of interference by summing an amount of interference experienced by the access node when utilizing the frequency channel and amounts of interference experienced by a group of the access nodes to which one of the frequency channels was already allocated in the first sequence of allocation processes when respectively utilizing this allocated frequency channel, and allocating the frequency channel corresponding to the lowest amount of aggregated interference to the access node. Further, the at least one processor is configured to determine, for each of the access nodes, a second amount of interference experienced by the access node when utilizing the first allocation of the frequency channels to the access nodes. Further, the at least one processor is configured to determine a second allocation of frequency channels by a second sequence of allocation processes in the order of decreasing second amount of interference experienced by the access node. For each of the access nodes, the second sequence of allocation processes comprises determining, for each of the frequency channels, an aggregated amount of interference by summing an amount of interference experienced by the access node when utilizing the frequency channel and amounts of interference experienced by all other access nodes when utilizing their allocated frequency channels, and allocating the frequency channel corresponding to the lowest amount of aggregated interference to the access node.

According to a further embodiment of the invention, a computer program or computer program product is provided, e.g., in the form of a non-transitory storage medium, which comprises program code to be executed by at least one processor of a node of a cellular network. Execution of the program code causes the at least one processor to determine, for each of a plurality of the access nodes of the cellular network, a first amount of interference experienced by the access node when utilizing an initial allocation of a plurality of frequency channels to the access nodes. Further, execution of the program code causes the at least one processor to determine a first allocation of frequency channels by a first sequence of allocation processes in the order of decreasing first amount of interference experienced by the access node. For each of the access nodes, the first sequence of allocation processes comprises determining, for each of the frequency channels, an aggregated amount of interference by summing an amount of interference experienced by the access node when utilizing the frequency channel and amounts of interference experienced by a group of the access nodes to which one of the frequency channels was already allocated in the first sequence of allocation processes when respectively utilizing this allocated frequency channel, and allocating the frequency channel corresponding to the lowest amount of aggregated interference to the access node. Further, execution of the program code causes the at least one processor to determine, for each of the access nodes, a second amount of interference experienced by the access node when utilizing the first allocation of the frequency channels to the access nodes. Further, execution of the program code causes the at least one processor to determine a second allocation of frequency channels by a second sequence of allocation processes in the order of decreasing second amount of interference experienced by the access node. For each of the access nodes, the second sequence of allocation processes comprises determining, for each of the frequency channels, an aggregated amount of interference by summing an amount of interference experienced by the access node when utilizing the frequency channel and amounts of interference experienced by all other access nodes when utilizing their allocated frequency channels, and allocating the frequency channel corresponding to the lowest amount of aggregated interference to the access node.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to concepts for controlling utilization of a plurality of frequency channels in a cellular network. The frequency channels may be subject to external interference, e.g., due to utilization by one or more access nodes of the cellular network and/or due to utilization by other spectrum users. The embodiments specifically refer to a scenario using LTE radio access technology. However, it should be understood that the concepts could also be applied in connection with other radio access technologies, e.g., Universal Mobile Telecommunications System (UMTS) radio access technology.

According to the illustrated concepts, a centralized channel selection algorithm is utilized, which is based on information concerning interference experienced by a plurality of access nodes. The access nodes may correspond to base stations or base station controllers. This information is collected by a node of the cellular network and evaluated to determine an allocation of a plurality of frequency channels to the access nodes. This node may for example be a control node which is responsible for controlling or managing the access nodes, such as an MME (Mobility Management Entity) of the LTE radio technology or an OSS (Operations Support System) node in the CN (Core Network) of the cellular network.

However, the node may also correspond to one of the access nodes. Further, the node may also correspond to multiple cooperating devices, e.g., a group of the access nodes. That is to say, functionalities of the channel selection algorithm may be distributed in a cloud-like manner over different devices.

In the illustrated concepts, the channel selection algorithm is based on two consecutive sequences of channel allocation processes, in the following also referred to as search loops. In each case, a single iteration of the search loop, with one instance of channel allocation processes for each access node, may be sufficient. Accordingly, the search loops may also be referred to as "linear". However, in some scenarios also multiple iterations of the second search loop or of both search loops may also be utilized.

In the first search loop, all frequency channels are initially regarded as being unallocated, and in the order of decreasing amount interference experienced by each of the access nodes, one of the available frequency channels is allocated to each of the access nodes.

Here, a frequency channel is considered to be "available" available if it is allowed to be used from regulatory perspective. Accordingly, also frequency channels already allocated to other access nodes would be available for allocation. This may also be referred to as a semi-greedy selection. The frequency channel which is allocated to the access node in the first search loop is in each case selected in such a way that it yields a lowest amount of aggregated interference. For a given access node, the amount of aggregated interference is determined by summing the amount of interference experienced by the access node when utilizing the considered frequency channel and the amounts of interference experienced by a group of the access nodes to which a frequency channel was already allocated in the first search loop. Interference contributions from other access nodes, to which a frequency channel was not yet allocated in the first search loop, are disregarded at this point.

In the second search loop, it is assumed that initially all access nodes are operated on the basis of the allocation of frequency channels as obtained by the first search loop. In the order of decreasing amount interference experienced by each of the access nodes (which due to the assumed allocation of frequency channels may be a different order than in the first search loop), it is checked for each of the access nodes whether allocating a different one of the frequency channels to the access node yields a lower aggregated amount of interference. If this is the case, the current allocation of frequency channels is modified by allocating this frequency channel to the access node. In the second search loop, the amount of aggregated interference for a given access node is determined by summing the amount of interference experienced by the access node when utilizing the considered frequency channel and the amounts of interference experienced by the other access nodes when utilizing their allocated frequency channel, i.e., the frequency channel which was allocated in the first search loop or, if the allocation was already modified in the second search loop, the frequency channel as allocated in the second search loop. In the second search loop, interference contributions from all other access nodes are considered when deciding whether to modify the allocation of frequency channels with respect to a given access node.

The allocation of frequency channels as obtained by the second search loop may then be applied by setting operating frequency channels of the access nodes accordingly.

Figure 1:
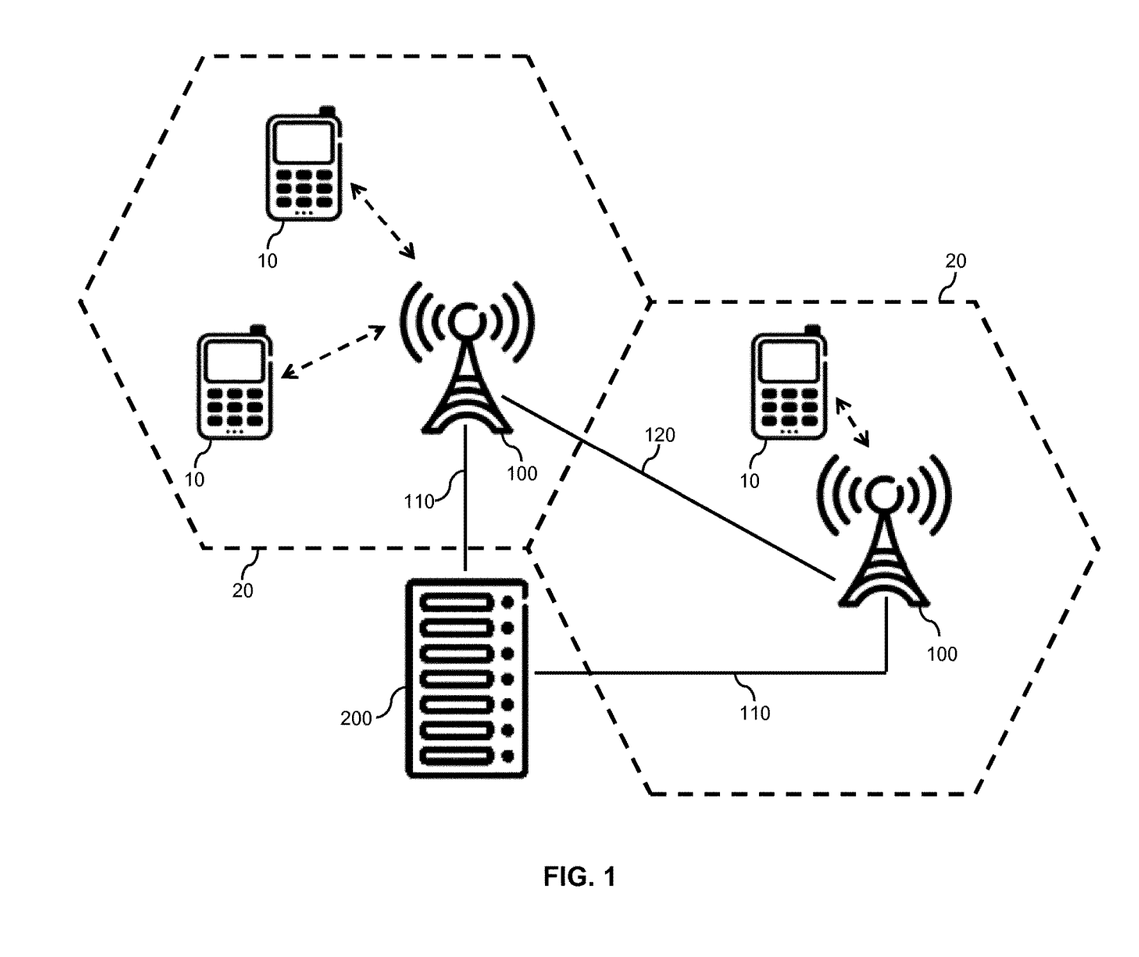
FIG. 1 schematically illustrates an exemplary cellular network environment in which utilization of frequency channels is controlled according to an embodiment of the invention.

FIG. 1 schematically illustrates the cellular network and exemplary elements which may be involved in implementing the channel selection algorithm. In particular, FIG. 1 illustrates multiple cells 20 of the cellular network. As further illustrated, in each of the cells 20, one or more user equipments (UEs) 10 may be served by an access node, in particular a base station 100 of the cell 20. In addition, FIG. 1 illustrates a control node 200, which is responsible for controlling or managing the different base stations 100, e.g., by utilizing a control interface 110. As further illustrated, the base stations 100 may also communicate with each other, e.g., by utilizing an inter-base station interface 120. The interfaces 110 and/or the interface 120 may in particular be utilized for conveying information concerning the amount of interference experienced by the base stations 100. Such information may include results of measurements performed by the base stations 100 and/or by the UEs 10. Further, such information may include numerical values representing the amount of interference, e.g., as derived from measurements performed by the base stations 100 and/or by the UEs 10.

It is to be understood that the scenario as illustrated in FIG. 1 is simplified to provide a better overview and that in practical implementations a larger number of cells 20 and corresponding access nodes 100 may be present.

Figure 2:
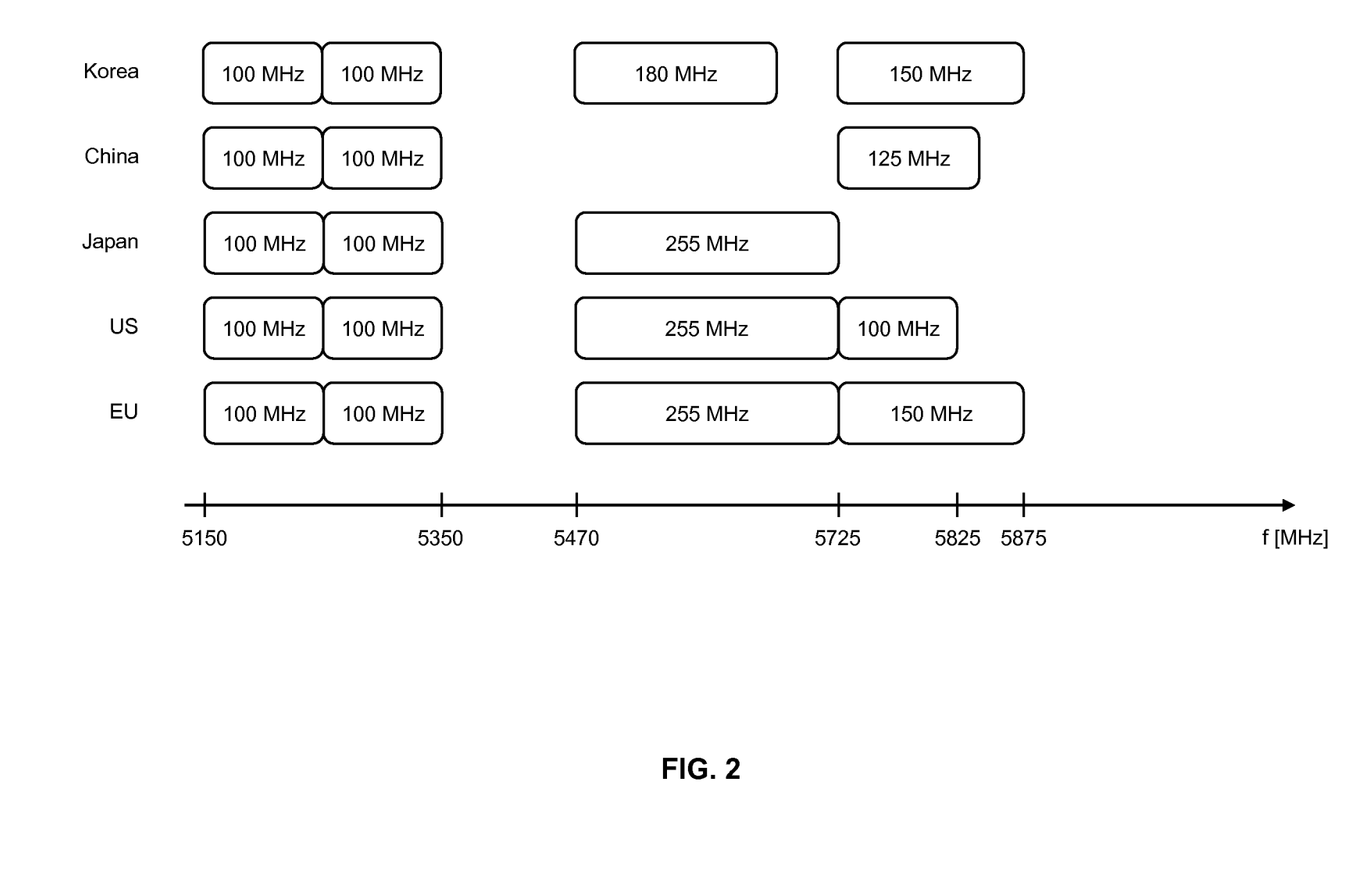
FIG. 2 schematically illustrates an unlicensed frequency spectrum in which the frequency channels are located according to an embodiment of the invention.

FIG. 2 shows an example of a frequency spectrum from which the frequency channels may be selected. More specifically, FIG. 2 illustrates an unlicensed frequency spectrum in the region of 5 GHz for various regions, including Europe (EU), the USA (US), Japan, China, and Korea. As can be seen, in each region, an unlicensed frequency band between 5150 MHz and 5250 MHz and an unlicensed frequency band between 5250 MHz and 5350 MHz are available. Further, unlicensed frequency bands may be available in a range between 5470 MHz and 5875 MHz. The bandwidths of these unlicensed frequency bands are from 100 MHz to 255 MHz, which is larger than the maximum bandwidth supported by the LTE radio technology. Accordingly, each of such frequency bands may support multiple frequency channels of the LTE radio technology, which may be assigned to different base stations to avoid interference.

According to an exemplary implementation, the channel selection algorithm may operate as follows:

Initially, one of the frequency channels is randomly allocated to each base station 100, and the base stations 100 start transmitting on the frequency channel allocated according to this initial allocation of frequency channels. Each base station may then determine the amount of interference experienced by its served UEs 10 from the other base stations 100 when utilizing this initial allocation of frequency channels. The amount of interference may be determined in various ways, and using various metrics. The amount of interference may for example be determined on the basis of measurements performed by the base station 100 and/or by the UEs 10 served by the base station 100. As a result, a single numerical value representing the amount of interference experienced by each base station 100 may be obtained.

By way of example, the determination of such a numerical value representing the amount of interference experienced by the base station 100 may involve that one of the UEs 10 served by the base station 100 synchronizes to another base station 100 and measures the RSRP (Reference Signal Received Power) with respect to this other base station 100. According to 3GPP TS 36.214 V11.1.0 (2012-12), the RSRP is defined as the linear average over the power contributions of the resource elements that carry cell-specific reference signals within the considered measurement frequency bandwidth, excluding noise and interference from other intra-frequency cells. From measurements of the RSRP by the UEs 10 served by one base station 100 with respect to another base station 100, a path loss between the two base stations 100 can be estimated. In some scenarios, also the path loss from every base station 100 to every UE 10 can be estimated. In each case, such estimated path losses allow for determining the amounts of interference experienced by each base station 100 without performing new measurements.

To determine an optimized allocation of the frequency channels to the base station 100 now the first and the second search loop may be executed.

For the first search loop, the base stations 100 are sorted in descending order of the amounts of interference measured when utilizing the initial allocation of frequency channels. The amount of interference experienced by the base station 100 may be determined as the sum or average of amounts of interference measured for each UE 10 served by the base station 100. In the following, this list of sorted base stations 100 is referred to as Usorted.

Starting from the first base station 100 of the list Usorted, i.e., the base station 100 which experiences the largest amount of interference, one of the frequency channels is allocated to each base station 100. This is performed by looping over all elements i of the list Usorted, with i=1 . . . |Usorted| denoting an index of the list elements. By starting with the base station 100 which experiences the largest amount of interference, this base station 100 is provided with the "largest choice" of frequency channels for making an optimum selection.

The allocation of the frequency channel is performed for each base station 100 based on an aggregated amount of interference. In particular, for each of the base station 100 the allocated frequency channel is selected in such a way that it provides the lowest amount of aggregated interference. Here, the aggregated amount of interference is determined by summing the amount of interference experienced by the base station 100 when utilizing the frequency channel and the amounts of interference experienced by the a group of the other base stations 100 to which a frequency channel was already allocated in the first search loop. The other base stations 100, to which a frequency channel was not yet allocated in the first search loop, are disregarded, i.e., are not contributing to the determined aggregated amount of interference.

The aggregated amount of interference obtained at the end of the first search loop, i.e., determined for the frequency channel allocated to the last base station 100 of the list, is then used as initial minimum aggregated amount of interference Imin for the second search loop.

For the second search loop, the base stations 100 are sorted in descending order of the amounts of interference experienced when utilizing the allocation of frequency channels as obtained by the first search loop. The amount of interference experienced by the base station 100 may be determined as the sum or average of amounts of interference determined for each UE 10 served by the base station 100, using the previously estimated path losses. In the following, this list of sorted base stations 100 is referred to as Usorted'. Here, it should be noted that due to the selections of the first search loop the list Usorted' will typically differ from the list Usorted.

Starting from the first base station 100 of the list Usorted', i.e., the base station 100 which experiences the largest amount of interference, it is checked whether allocation of another frequency channel to the base station 100 provides a lower aggregated amount of interference, an amount of interference lower than Imin. If this is the case, this other frequency channel is allocated to the base station 100, and the value of Imin is set to the lower aggregated amount of interference provided by this frequency channel. This is performed by looping over all elements i of the list Usorted', with i=1 . . . |Usorted'| denoting an index of the list elements. By starting with the base station 100 which experiences the largest amount of interference, this base station 100 is provided with the "largest choice" of frequency channels for optimizing the frequency channel allocation.

In the second search loop, the aggregated amount of interference is determined by summing the amount of interference experienced by the base station 100 when utilizing the considered frequency channel and the amounts of interference experienced by the other base stations 100 when utilizing their currently allocated frequency channel, i.e., the frequency channel as allocated in the first search loop or as reallocated in the second search loop. In the second search loop, all base stations 100 are contributing to the determined aggregated amount of interference.

The allocation of frequency channels obtained at the end of the second search loop is then applied to the base stations 100.

The first and the second search loop can be repeated for different random initial allocations of frequency channels, thereby allowing for covering more search space and avoiding getting trapped in a local minimum. In some scenarios, it is also possible to iteratively repeat the second search loop, e.g., until no allocation providing a lower Imin is found or a configured maximum number of iterations is reached. The allocation of frequency channels which is then applied to the base stations 100 is then selected as the one which offers the lowest Imin at the end of the second search loop (or at the end of the last iteration of the second search loop).

The channel selection algorithm may for example be implemented in the control node 200, which for this purpose may receive indications of the amounts of interference and/or of the underlying measurement results from the base stations 100, e.g., via the interfaces 110. The control node 200 may then apply the obtained allocation of frequency channels by sending channel selection commands to the base stations 100.

Alternatively, the channel selection algorithm may be implemented in one of the access nodes 100, which for this purpose may receive indications of the amounts of interference and/or of the underlying measurement results from the other base stations 100, e.g., via the inter-base station interface 120. The base station 100 may then apply the obtained allocation of frequency channels by sending channel selection commands to the other base stations 100.

Further, functionalities of the channel selection algorithm may also be distributed in a cloud-like manner over multiple devices, such as multiple base stations 100 or one or more base stations 100 and the control node 200.

Figure 3:
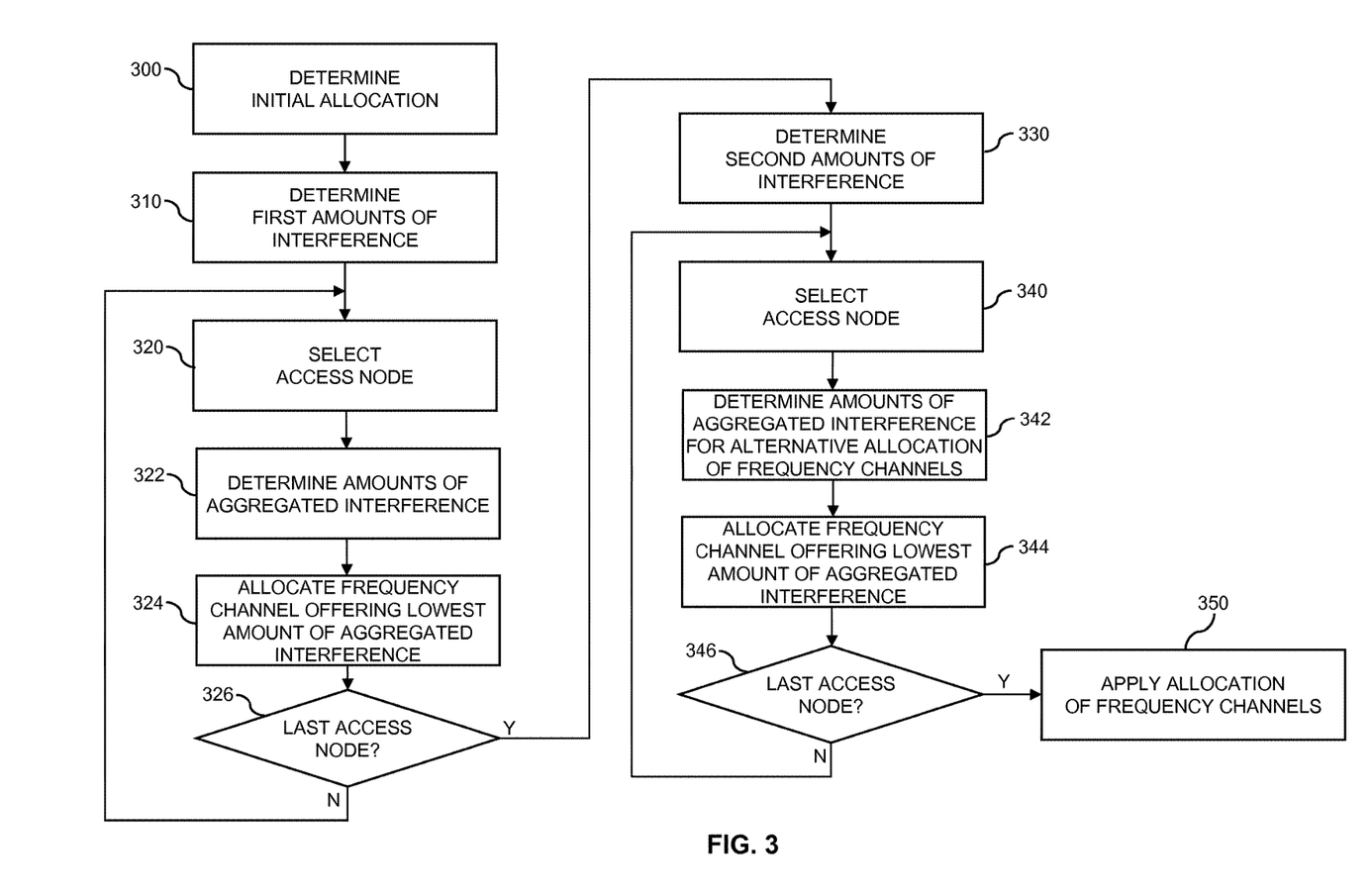
FIG. 3 shows a flowchart for illustrating a method of controlling utilization of a plurality of frequency channels according to an embodiment of the invention.

FIG. 3 shows a flowchart for illustrating a method of controlling utilization of a plurality of frequency channels in a cellular network. The method may be used for implementing the above-described concepts in a node of the cellular network, e.g., in a control node such as the control node 200, or in an access node, such as one of the base stations 100. In some scenarios, the node may also correspond to a cloud of multiple devices, such as two or more access nodes, or one or more access nodes and a control node 200. If a processor based implementation of the node is used, the steps of the method may be performed by one or more processors of the node. For this purpose, the processor(s) may execute correspondingly configured program code. Further, at least some of the corresponding functionalities may be hardwired in the processor(s).

At step 300, the node may determine an initial allocation of the frequency channels to a plurality of access nodes of the cellular network. The frequency channels may be from an unlicensed frequency spectrum, i.e., a frequency spectrum which is not exclusively assigned to the cellular network and may also be utilized by other cellular networks or other radio technologies. The frequency channels may also be from a shared licensed frequency spectrum, i.e., a frequency spectrum which is assigned to the cellular network by a regulatory authority but shared with a known and limited set of other spectrum users. The access nodes may for example correspond to base stations or to base station controllers. The node may determine the initial allocation of frequency channels to the access nodes by randomly allocating one of the frequency channels to each of the access nodes. As an alternative, the node may determine the initial allocation by reusing a previously utilized allocation of frequency channels or by allocating the frequency channels according to a predetermined pattern to the access nodes.

At step 310, the node determines, for each of the access nodes, a first amount of interference experienced by the access node when utilizing the initial allocation of the frequency channels to the access nodes. This be accomplished on the basis of measurements performed by communication devices connected to the cellular network, such as the UEs 10, and/or on the basis of measurements performed by the access nodes. Such measurements may also be utilized by the node for estimating a path loss between each pair of the access nodes. The path losses may then be utilized by the node for estimating amounts of interference experienced by the access nodes for various different allocations of the frequency channels to the access nodes.

The node then determines a first allocation of frequency channels by a first sequence of allocation processes in the order of decreasing first amount of interference experienced by the access nodes. The first sequence of allocation processes is illustrated by the loop including steps 320, 322, 324, and 326.

At step 320 the node selects one of the access nodes. This selection is performed in the order of decreasing first amount of interference experienced by the access nodes, i.e., the access node is selected which has the highest first amount of interference and was not yet selected in previous iterations of the loop.

At step 322, the node determines, for each of the frequency channels, an aggregated amount of interference. The aggregated amount of interference is determined by summing an amount of interference experienced by the selected access node when utilizing the considered frequency channel and amounts of interference experienced by a group of the access nodes to which one of the frequency channels was already allocated in the first sequence of allocation processes when respectively utilizing this allocated frequency channel. Here, the selected access node is not part of the group of the access nodes. The amounts of interference experienced by the access nodes may be determined on the basis of path losses, e.g., as estimated from the measurements of step 310.

At step 324, the node allocates the frequency channel corresponding to the lowest amount of aggregated interference to the access node.

At step 326, the node checks whether the access node is the last access node of the first sequence. If this is not the case, the method returns to step 320 to select a further access node, as indicated by branch "N". If the access node is the last access node of the first sequence, the method continues with step 330, as indicated by branch "Y".

At step 330, the node determines, for each of the access nodes, a second amount of interference experienced by the access node when utilizing the first allocation of the frequency channels to the access nodes. The second amounts of interference experienced by the access nodes may be determined on the basis of path losses, e.g., as estimated from the measurements of step 310.

The node then determines a second allocation of frequency channels by a second sequence of allocation processes in the order of decreasing second amount of interference experienced by the access nodes. The second sequence of allocation processes is illustrated by the loop including steps 340, 342, 344, and 346.

At step 340 the node selects one of the access nodes. This selection is performed in the order of decreasing second amount of interference experienced by the access nodes, i.e., the access node is selected which has the highest second amount of interference and was not yet selected in previous iterations of the loop. The selected access node may be different from the access node selected at step 320.

At step 342, the node determines, for each of the frequency channels, an aggregated amount of interference. This is accomplished by summing an amount of interference experienced by the selected access node when utilizing the considered frequency channel and amounts of interference experienced by all other access nodes when utilizing their allocated frequency channels, i.e., the frequency channel as allocated in the first sequence of allocation processes or, if applicable, as allocated in the second sequence of allocation processes.

At step 344, the node allocates the frequency channel corresponding to the lowest amount of aggregated interference to the selected access node. Depending on the aggregated amount of interference, this may involve modifying the allocation of step 324 or maintaining the allocation of step 324.

At step 346, the node checks whether the selected access node is the last access node of the second sequence. If this is not the case, the method returns to step 340 to select a further access node, as indicated by branch "N". If the access node is the last access node of the second sequence, the method continues with step 350, as indicated by branch "Y".

At step 350, the node applies the allocation of frequency channels as obtained by the second sequence of allocation processes. This may involve sending channel selection commands to the access nodes. If the node is one of the access nodes, this may also involve locally applying the obtained allocation of frequency channels.

In some scenarios, the node may iteratively repeat the determination of the second amounts of interference and the second sequence of allocation processes, e.g., steps 330, and the loop of steps 342, 344, and 346. The node may end this iterative repetition in response to the aggregated amount of interference not being further lowered in an iteration of the iterative repetition. Further, the node may end the iterative repetition after a configured number of iterations. In some scenarios, the node may also continue with the iterative repetition and apply the obtained allocation of frequency channels after each iteration.

In some scenarios, the node may repeat the determination of the first amounts of interference, the first sequence of allocation processes, the determination of the second amounts of interference, and the second sequence of allocation processes, starting from a different initial allocation of the frequency channels to the access nodes, e.g., may repeat steps 300, 310, the loop of steps 320, 322, 324, and 326, step 330, and the loop of steps 340, 342, 344, and 346, to obtain a set of second allocations of frequency channels. From the set of second allocations of frequency channels, the node may then select a second allocation of frequency channels corresponding to the lowest amount of aggregated interference after the second sequence of allocation processes.

Figure 4:
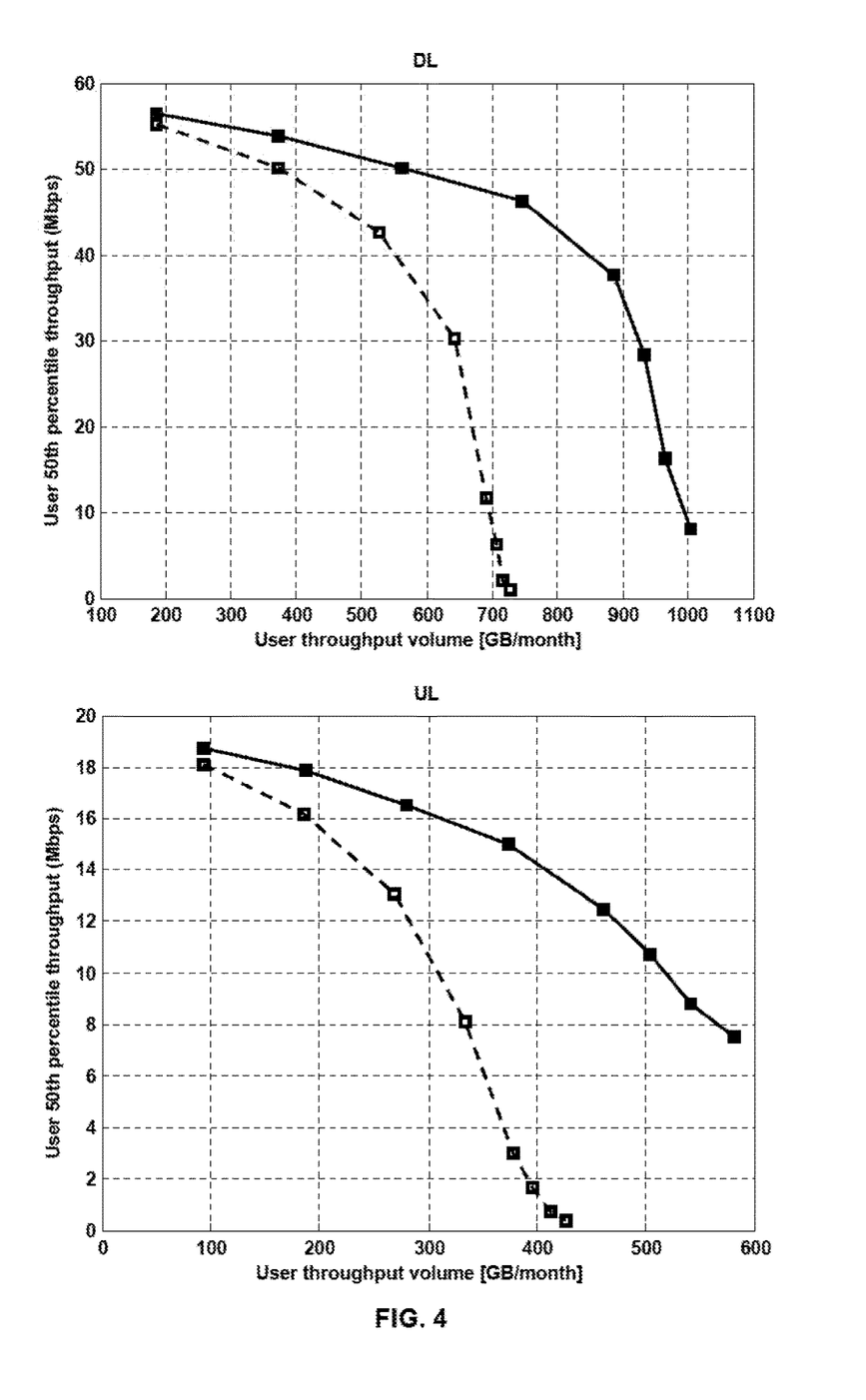
FIGS. 4 and 5 illustrate exemplary performance evaluations when utilizing an allocation of frequency channels obtained according to an embodiment of the invention.
Figure 5:
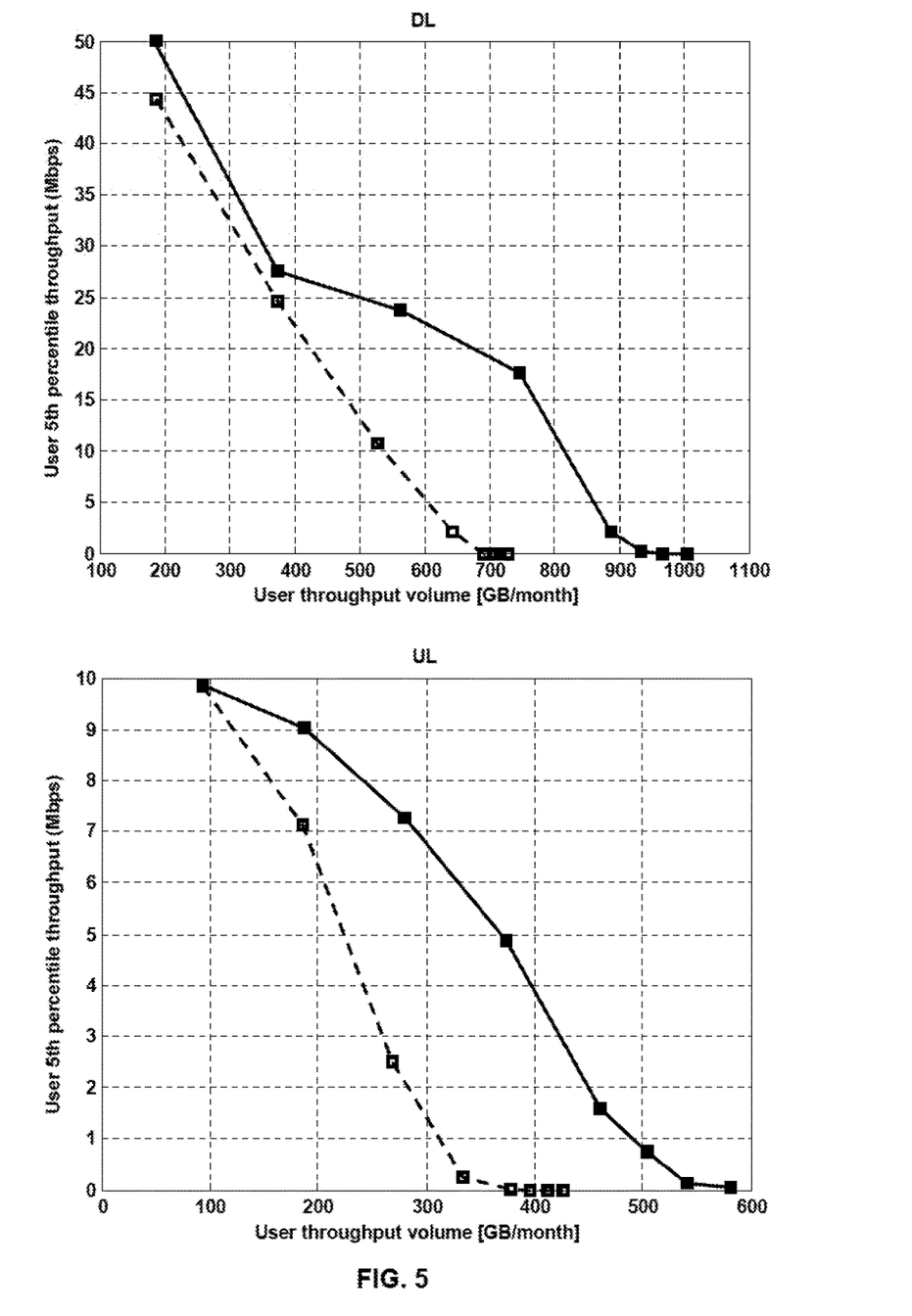

Performance evaluations have shown that the channel selection algorithm of the illustrated concepts offers better performance than other channel selection algorithms. In FIGS. 4 and 5, results obtained on the basis of the channel selection algorithm of the illustrated concepts (illustrated by solid symbols and a solid line) are compared to results of a mere random selection of the frequency channels (illustrated by open symbols and dashed lines) for downlink transmission (denoted by DL) and uplink transmission (denoted by UL). In this respect, downlink transmission may correspond to a transmission of data from the cellular network, e.g. a node of the cellular network, to a communication device of a user, and uplink transmission may correspond to a transmission of data from a communication device of a user to the cellular network, e.g. a node of the cellular network. The diagrams show the 50th and the 5th percentile of the user throughput random distribution (the user throughput is a random variable due to random user locations and random radio channel behavior) versus the traffic load in the system. The 50th percentile represents users with "average" radio conditions, while the 5th percentile is typically interpreted to represent "cell edge users". It can be seen that the throughput for an individual user generally decreases with increasing traffic load. The channel selection algorithm of the illustrated concepts however provides a better user experience at equal load or allows the system to be loaded more heavily (i.e. serve more users) at equal per-user performance.

Figure 6:
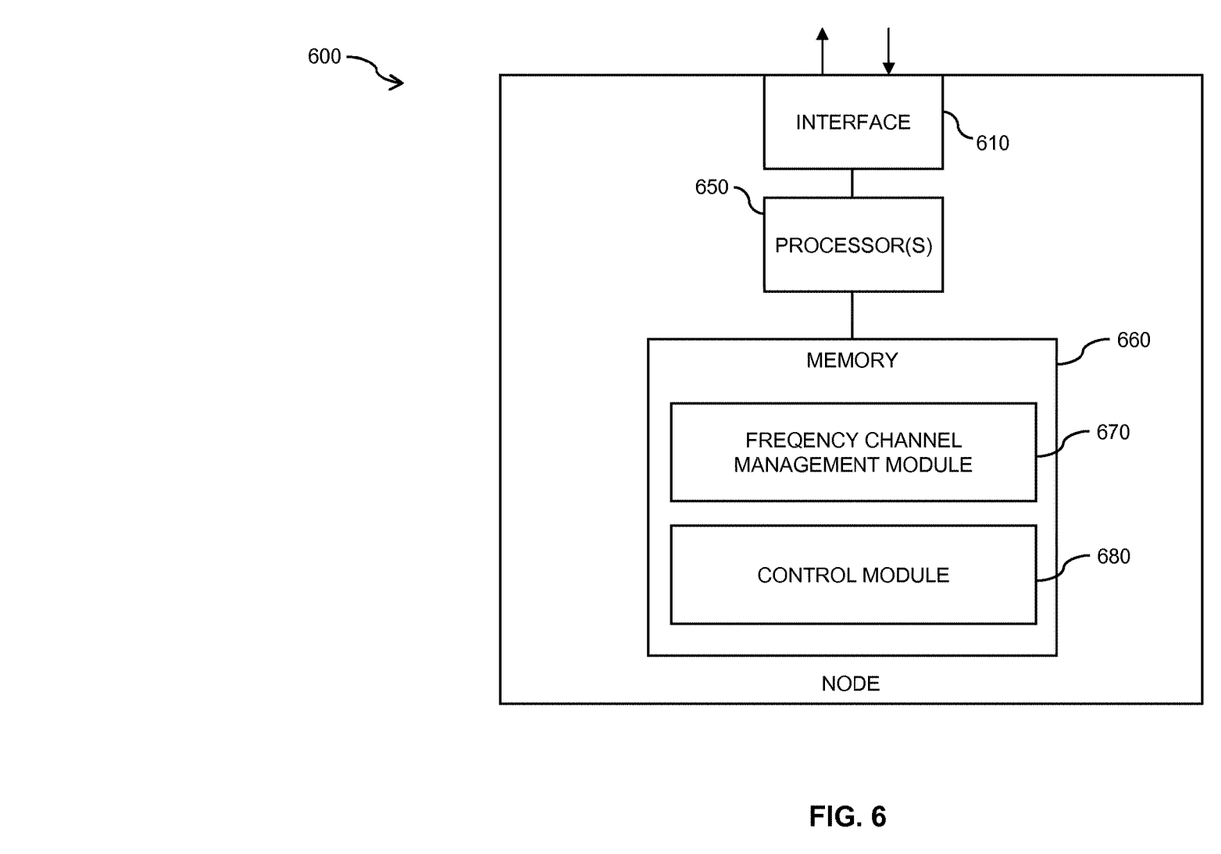
FIG. 6 schematically illustrates structures of a node according to an embodiment of the invention.

FIG. 6 illustrates exemplary structures which may be used for implementing the above concepts in a node 600 of a cellular network, e.g., an access node, such as one of the access nodes 100, or a control node, such as the control node 200.

As illustrated, the node 600 may include an interface 610 for communication with access nodes, e.g., with the base stations such as the base stations 100. The interface 610 may be utilized for receiving information with respect to amounts of interference experienced by the access nodes. The interface 610 may also be utilized for controlling selection of a frequency channel by the access nodes, e.g., by sending channel selection commands.

Further, the node 600 includes one or more processors 650 coupled to the interface 610, and a memory 660 coupled to the processor(s) 650. The memory 660 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 660 includes suitably configured program code to be executed by the processor(s) 650 so as to implement the above-described functionalities of the node 600. In particular, the memory 660 may include various program code modules for causing the node 600 to perform processes as described above, e.g., corresponding to the method steps of FIG. 3. As illustrated, the memory 660 may include a frequency channel management module 670 for implementing the above-described functionalities of the channel selection algorithm. Further, the memory 660 may include a control module 680 for implementing various control functionalities, such as sending channel selection commands to access nodes.

It is to be understood that the structures as illustrated in FIG. 6 are merely schematic and that the node 600 may actually include further components which, for the sake of clarity, have not been illustrated, e.g., further interfaces or processors. Also, it is to be understood that the memory 660 may include further types of program code modules, which have not been illustrated, e.g., program code modules for implementing known functionalities of an access node or control node of a cellular network. According to some embodiments, also a computer program may be provided for implementing functionalities of the node 600, e.g., in the form of a physical medium storing the program code and/or other data to be stored in the memory 660 or by making the program code available for download or by streaming.

As can be seen, the concepts as described above may be used for efficiently controlling utilization of a plurality of frequency channels in a cellular network. In particular, due to the consecutive search loops, an optimized allocation of frequency channels to a plurality of access nodes can be obtained in an automated manner, without requiring excessive measurements or trial of allocations.

It is to be understood that the examples and embodiments as explained above are merely illustrative and susceptible to various modifications. For example, the illustrated concepts may be applied in connection with various radio technologies, without limitation to the above-mentioned LTE radio technology. Further, the illustrated channel selection algorithm may be implemented in various nodes of the cellular network. Such nodes may be implemented in a single device or in a cloud of multiple devices. Moreover, it is to be understood that the above concepts may be implemented by using correspondingly designed software to be executed by one or more processors of an existing device, or by using dedicated device hardware.

The invention claimed is:

1. A method of controlling utilization of a plurality of frequency channels in a cellular network, the method comprising:
    A) a node of the cellular network determining, for each of a plurality of access nodes of the cellular network, a first amount of interference experienced by the access node when utilizing an initial allocation of the frequency channels to the access nodes;
    B) the node determining a first allocation of frequency channels by a first sequence of allocation processes in the order of decreasing first amount of interference experienced by the access node, the first sequence of allocation processes comprising for each of the access nodes:
        B1) the node determining, for each of the frequency channels, an aggregated amount of interference by summing an amount of interference experienced by the access node when utilizing the frequency channel and amounts of interference experienced by a group of the access nodes to which one of the frequency channels was already allocated in the first sequence of allocation processes when respectively utilizing this allocated frequency channel; and
        B2) the node allocating the frequency channel corresponding to the lowest amount of aggregated interference to the access node;
    C) the node determining, for each of the access nodes, a second amount of interference experienced by the access node when utilizing the first allocation of the frequency channels to the access nodes; and
    D) the node determining a second allocation of frequency channels by a second sequence of allocation processes in the order of decreasing second amount of interference experienced by the access node, the second sequence of allocation processes comprising for each of the access nodes:
        D1) the node determining, for each of the frequency channels, an aggregated amount of interference by summing an amount of interference experienced by the access node when utilizing the frequency channel and amounts of interference experienced by all other access nodes when utilizing their allocated frequency channels; and
        D2) the node allocating the frequency channel corresponding to the lowest amount of aggregated interference to the access node.

2. The method of claim 1, further comprising the node determining the initial allocation of frequency channels to the access nodes by randomly allocating one of the frequency channels to each of the access nodes.

3. The method of claim 1, further comprising the node iteratively repeating the determination of the second amounts of interference and the second sequence of allocation processes.

4. The method of claim 3, further comprising the node ending said iterative repeating of the determination of the second amounts of interference and the second sequence of allocation processes in response to the aggregated amount of interference not being lowered in an iteration of said iterative repeating of the determination of the second amounts of interference and the second sequence of allocation processes.

5. The method of claim 3, further comprising the node ending said iterative repeating of the determination of the second amounts of interference and the second sequence of allocation processes after a configured number of iterations of said iterative repeating of the determination of the second amounts of interference and the second sequence of allocation processes.

6. The method of claim 1, further comprising:
starting from a different initial allocation of the frequency channels to the access nodes, the node repeating the determination of the first amounts of interference, the first sequence of allocation processes, the determination of the second amounts of interference, and the second sequence of allocation processes to obtain a set of second allocations of frequency channels; and
from the set of second allocations of frequency channels, the node selecting a second allocation of frequency channels corresponding to the lowest amount of aggregated interference after the second sequence of allocation processes.

7. The method of claim 1, further comprising the node estimating the amounts of interference experienced by the access nodes based on measurements performed by communication devices connected to the cellular network.

8. The method of claim 1, further comprising the node estimating the amounts of interference experienced by the access nodes based on measurements performed by the access nodes.

9. The method of claim 7, further comprising:
the node estimating, based on the measurements, a path loss between each pair of the access nodes; and
the node estimating the amounts of interference experienced by the access nodes based on the estimated path losses.

10. The method of claim 1, wherein the node comprises one or more of the access nodes.

11. The method of claim 1, wherein the node comprises a control node responsible for controlling the access nodes.

12. The method of claim 1, wherein the frequency channels are from an unlicensed frequency spectrum.

13. The method of claim 1, wherein the frequency channels are from a shared licensed frequency spectrum.

14. A node for a cellular network, the node comprising:
an interface for communication with access nodes of the cellular network;
processing circuitry; and
memory containing instructions executable by the processing circuitry whereby the node is operative to:
A) determine, for each of a plurality of the access nodes of the cellular network, a first amount of interference experienced by the access node when utilizing an initial allocation of a plurality of frequency channels to the access nodes;
B) determine a first allocation of frequency channels by a first sequence of allocation processes in the order of decreasing first amount of interference experienced by the access node, the first sequence of allocation processes comprising for each of the access nodes:
B1) determining, for each of the frequency channels, an aggregated amount of interference by summing an amount of interference experienced by the access node when utilizing the frequency channel and amounts of interference experienced by a group of the access nodes to which one of the frequency channels was already allocated in the first sequence of allocation processes when respectively utilizing this allocated frequency channel; and
B2) allocating the frequency channel corresponding to the lowest amount of aggregated interference to the access node;
C) determine, for each of the access nodes, a second amount of interference experienced by the access node when utilizing the first allocation of the frequency channels to the access nodes; and
D) determine a second allocation of frequency channels by a second sequence of allocation processes in the order of decreasing second amount of interference experienced by the access node, the second sequence of allocation processes comprising for each of the access nodes:
D1) determining, for each of the frequency channels, an aggregated amount of interference by summing an amount of interference experienced by the access node when utilizing the frequency channel and amounts of interference experienced by all other access nodes when utilizing their allocated frequency channels; and
D2) allocating the frequency channel corresponding to the lowest amount of aggregated interference to the access node.

15. The node of claim 14, wherein the instructions are such that the node is operable to determine the initial allocation of frequency channels to the access nodes by randomly allocating one of the frequency channels to each of the access nodes.

16. The node of claim 14, wherein the instructions are such that the node is operable to iteratively repeat the determination of the second amounts of interference and the second sequence of allocation processes.

17. The node of claim 16, wherein the instructions are such that the node is operable to end said iterative repeating of the determination of the second amounts of interference and the second sequence of allocation processes in response to the aggregated amount of interference not being lowered in an iteration of said iterative repeating of the determination of the second amounts of interference and the second sequence of allocation processes.

18. The node of claim 16, wherein the instructions are such that the node is operable to end said iterative repeating of the determination of the second amounts of interference and the second sequence of allocation processes after a configured number of iterations of said iterative repeating of the determination of the second amounts of interference and the second sequence of allocation processes.

19. The node of claim 14, wherein the instructions are such that the node is operable to:
starting from a different initial allocation of the frequency channels to the access nodes, repeat the determination of the first amounts of interference, the first sequence of allocation processes, the determination of the second amounts of interference, and the second sequence of allocation processes to obtain a set of second allocations of frequency channels; and from the set of second allocations of frequency channels, select a second allocation of frequency channels corresponding to the lowest amount of aggregated interference after the second sequence of allocation processes.

20. The node of claim 14, wherein the instructions are such that the node is operable to estimate the amounts of interference experienced by the access nodes based on measurements performed by communication devices connected to the cellular network.

21. The node of claim 14, wherein the instructions are such that the node is operable to estimate the amounts of interference experienced by the access nodes based on measurements performed by the access nodes.

22. The node of claim 20, wherein the instructions are such that the node is operable to:
estimate, based on the measurements, a path loss between each pair of the access nodes; and
estimate the amounts of interference experienced by the access nodes based on the estimated path losses.

23. The node of claim 14, wherein the node comprises one or more of the access nodes.

24. The node of claim 14, wherein the node comprises a control node responsible for controlling the access nodes.

25. The node of claim 14, wherein the frequency channels are from an unlicensed frequency spectrum.

26. The node of claim 14, wherein the frequency channels are from a shared licensed frequency spectrum.

27. A non-transitory computer readable recording medium storing a computer program product for controlling utilization of a plurality of frequency channels in a cellular network, the computer program product comprising software instructions which, when run on processing circuitry of a node of the cellular network, causes the node to:
A) determine, for each of a plurality of access nodes of the cellular network, a first amount of interference experienced by the access node when utilizing an initial allocation of the frequency channels to the access nodes;
B) determine a first allocation of frequency channels by a first sequence of allocation processes in the order of decreasing first amount of interference experienced by the access node, the first sequence of allocation processes comprising for each of the access nodes:
B1) the node determining, for each of the frequency channels, an aggregated amount of interference by summing an amount of interference experienced by the access node when utilizing the frequency channel and amounts of interference experienced by a group of the access nodes to which one of the frequency channels was already allocated in the first sequence of allocation processes when respectively utilizing this allocated frequency channel; and
B2) the node allocating the frequency channel corresponding to the lowest amount of aggregated interference to the access node;
C) determine, for each of the access nodes, a second amount of interference experienced by the access node when utilizing the first allocation of the frequency channels to the access nodes; and
D) determine a second allocation of frequency channels by a second sequence of allocation processes in the order of decreasing second amount of interference experienced by the access node, the second sequence of allocation processes comprising for each of the access nodes:
D1) the node determining, for each of the frequency channels, an aggregated amount of interference by summing an amount of interference experienced by the access node when utilizing the frequency channel and amounts of interference experienced by all other access nodes when utilizing their allocated frequency channels; and
D2) the node allocating the frequency channel corresponding to the lowest amount of aggregated interference to the access node.

* * * * *